United States Patent
Sabotta et al.

(10) Patent No.: US 10,844,960 B2
(45) Date of Patent: Nov. 24, 2020

(54) CRANKSHAFT SEAL DESIGN

(71) Applicant: Caterpillar Inc., Deerfield, IL (US)

(72) Inventors: Christian Sabotta, Washington, IL (US); John M. Mashak, Peoria, IL (US); Scott Rice, Gilford, NH (US); Tyler J. Davis, Washington, IL (US); Nicholas O'Connor, Loudon, NH (US)

(73) Assignee: Caterpillar Inc., Peoria, IL (US)

( * ) Notice: Subject to any disclaimer, the term of this patent is extended or adjusted under 35 U.S.C. 154(b) by 162 days.

(21) Appl. No.: 16/209,321

(22) Filed: Dec. 4, 2018

(65) Prior Publication Data

US 2020/0173558 A1    Jun. 4, 2020

(51) Int. Cl.

| | |
|---|---|
| *F16J 15/34* | (2006.01) |
| *F16J 15/3236* | (2016.01) |
| *F16C 3/14* | (2006.01) |
| *F16C 33/74* | (2006.01) |
| *F16J 15/3284* | (2016.01) |

(52) U.S. Cl.
CPC ............ *F16J 15/3236* (2013.01); *F16C 3/14* (2013.01); *F16C 33/74* (2013.01); *F16J 15/3284* (2013.01)

(58) Field of Classification Search
CPC ...... F16J 15/3236; F16J 15/3284; F16C 3/14; F16C 33/74
See application file for complete search history.

(56) References Cited

U.S. PATENT DOCUMENTS

| | | | | |
|---|---|---|---|---|
| 3,973,779 A | * | 8/1976 | Burgmann | F16J 15/164 |
| | | | | 277/425 |
| 4,428,586 A | * | 1/1984 | Romero | F16J 15/3256 |
| | | | | 277/377 |
| 4,667,967 A | * | 5/1987 | Deuring | F16J 15/54 |
| | | | | 277/351 |
| 5,370,404 A | | 12/1994 | Klein et al. | |
| 5,462,287 A | * | 10/1995 | Hering | F02F 11/007 |
| | | | | 277/559 |
| 5,509,667 A | | 4/1996 | Klein et al. | |
| 5,921,555 A | | 7/1999 | Johnston | |
| 6,237,207 B1 | * | 5/2001 | Vom Stein | B25B 23/08 |
| | | | | 269/47 |

(Continued)

FOREIGN PATENT DOCUMENTS

| | | |
|---|---|---|
| CN | 201954003 U | 8/2011 |
| CN | 203796438 A | 8/2014 |

(Continued)

*Primary Examiner* — Gilbert Y Lee
(74) *Attorney, Agent, or Firm* — Pam Ruschau

(57) ABSTRACT

A shaft seal for disposition between a shaft mounted for rotation and a bore includes a radial shaft-sealing sleeve assembly rotatably mounted with an outer carrier assembly. The radial shaft-sealing sleeve assembly includes a radial shaft-sealing sleeve and a first contact exclusion lip. The outer carrier assembly includes an outer carrier with a molded seal along having an outer radial section of the outer carrier and an elongated molded seal lip extending into a chamber formed between the radial shaft-sealing sleeve and the outer carrier, a second contact exclusion lip, and a main pumping lip. The first contact exclusion lip forming a dynamic seal against the outer carrier, and the second contact exclusion lip and main pumping lip forming dynamic seals against the radial shaft-sealing sleeve.

20 Claims, 3 Drawing Sheets

(56) References Cited

U.S. PATENT DOCUMENTS

| | | |
|---|---|---|
| 6,409,177 B1 | 6/2002 | Johnston |
| 6,729,624 B1 | 5/2004 | Johnston |
| 8,960,362 B2 | 2/2015 | Barbir |
| 8,967,730 B2 | 3/2015 | Antoine et al. |
| 9,279,500 B2 | 3/2016 | Bishop |
| 9,714,071 B2 | 7/2017 | McDonald et al. |
| 9,836,066 B2 | 12/2017 | Williams et al. |
| 2004/0227303 A1 | 11/2004 | Bock |
| 2005/0104299 A1* | 5/2005 | Iketani ............ F04D 29/628 277/309 |
| 2014/0239597 A1 | 8/2014 | White |
| 2016/0097454 A1 | 4/2016 | Chapagain et al. |
| 2016/0097455 A1 | 4/2016 | Chapagain et al. |
| 2016/0325214 A1 | 11/2016 | Davis |
| 2018/0163873 A1 | 6/2018 | Jarosinski |

FOREIGN PATENT DOCUMENTS

| | | |
|---|---|---|
| CN | 106122480 A | 11/2016 |
| KR | 10-2013-0016257 A | 2/2013 |

\* cited by examiner

CRANKSHAFT SEAL DESIGN

TECHNICAL FIELD

This patent disclosure relates generally to a seal between a rotating shaft and a housing, more particularly to a seal for disposition between a rotatable crankshaft and an engine housing.

BACKGROUND

Engines of machines commonly include a crankcase from which a rotatable crankshaft extends, on one or more sides. The crankcase typically contains oil or another lubricant necessary for lubrication of internal components. It is important to keep such lubricant inside the crankcase where the crankshaft passes through the block, both front and rear, as well as keep outside debris from getting into the engine at these same locations. In order to minimize dirt and debris entering the crankcase and inhibit the passage of lubricant out of the crankcase, a crankshaft seal may be disposed between the crankshaft and the housing of the crankcase. Due to associated mechanical forces and environmental effects, however, the crankcase seal may not meet target lifespan or effectiveness. This can be particularly problematic when utilized in heavy duty engines that may generate high temperatures, or be operated in extreme conditions. As a result, partial failure of such seals may result in leakage of lubricant from the crankcase or passage of debris or dirt into the crankcase. At the extreme, a complete failure of the seal may necessitate premature replacement, requiring the machine to be taken out of service and repaired.

Various attempts have been made to address these challenges. For example, in CN201954003U, an engine front crankshaft oil seal includes inner and outer seal skeletons to which are secured seal structures including a grip structure, a felt layer, a dust lip, a spiral structure, and a main seal lip.

SUMMARY

The disclosure describes, in one aspect, a shaft seal for disposition between a shaft mounted for rotation and a bore. The shaft seal includes a radial shaft-sealing sleeve assembly rotatably mounted with an outer carrier assembly. The radial shaft-sealing sleeve assembly includes a radial shaft-sealing sleeve with a first contact exclusion lip coupled to a generally radially-extending section of a radially-extending portion of the radial shaft-sealing sleeve. The outer carrier assembly includes an outer carrier to which a molded seal, a second contact exclusion lip, and a main pumping lip are secured. The molded seal includes an outer radial section extending along an offset section of an axially-extending portion of the outer carrier. The molded seal further includes an elongated molded seal lip extending from an inside surface of a generally radially-extending section of the outer carrier. A distal end of the first contact exclusion lip is dynamically disposed against and biased toward an axially-extending portion of the outer carrier, while the distal end of the second contact exclusion lip and a dynamic seal portion of the main pumping lip are dynamically disposed against and biased toward an axially-extending portion of the radial shaft-sealing sleeve. The radial shaft-sealing sleeve assembly and the outer carrier assembly form at least one internal chamber there between, the elongated molded seal lip extending into the at least one internal chamber.

This disclosure describes in another aspect, engine including a housing having a bore, the housing defining an interior and an exterior. A crank shaft is rotatably mounted through the bore, and a shaft seal is disposed between the shaft and the bore. The shaft seal includes a radial shaft-sealing sleeve assembly disposed for rotation with the crank shaft within an outer carrier assembly disposed within the bore. The radial shaft-sealing sleeve assembly includes a radial shaft-sealing sleeve with a first contact exclusion lip coupled to a generally radially-extending section of a radially-extending portion of the radial shaft-sealing sleeve. The outer carrier assembly includes an outer carrier to which a molded seal, a second contact exclusion lip, and a main pumping lip are secured. The molded seal includes an outer radial section extending along an offset section of an axially-extending portion of the outer carrier. The molded seal further includes an elongated molded seal lip extending from an inside surface of a generally radially-extending section of the outer carrier. A distal end of the first contact exclusion lip is dynamically disposed against and biased toward an axially-extending portion of the outer carrier, while the distal end of the second contact exclusion lip and a dynamic seal portion of the main pumping lip are dynamically disposed against and biased toward an axially-extending portion of the radial shaft-sealing sleeve. The radial shaft-sealing sleeve assembly and the outer carrier assembly form at least one internal chamber there between, the elongated molded seal lip extending into the at least one internal chamber.

In yet another aspect, this disclosure describes a method of fabricating a shaft seal for disposition between a shaft mounted for rotation and a bore. The method includes forming a radial shaft-sealing sleeve assembly by forming a radial shaft-sealing sleeve, forming a first contact exclusion lip, and securing the first contact exclusion lip to a generally radially-extending section of the radial shaft-sealing sleeve. The method further includes forming an outer carrier assembly by forming an outer carrier, molding a molded seal to the outer carrier, the molded seal having an outer radial section extending along the an axially-extending portion of the outer carrier, and an elongated molded seal lip extending from an inside surface of a generally radially-extending section of a radially-extending portion of the outer carrier. The method further includes forming a second contact exclusion lip, forming a main pumping lip, and securing the second contact exclusion lip and the main pumping lip to the generally radially-extending section of the outer carrier. The method further includes axially sliding the radial shaft-sealing sleeve assembly into relatively rotatable position within the outer carrier assembly with a distal end of the first contact exclusion lip being dynamically disposed against and biased toward an axially-extending portion of the outer carrier, and a distal end of the second contact exclusion lip and a dynamic seal portion of the main pumping lip being dynamically disposed against and biased toward the axially-extending portion of the radial shaft-sealing sleeve.

BRIEF DESCRIPTION OF THE DRAWING(S)

DETAILED DESCRIPTION

Figure 1:
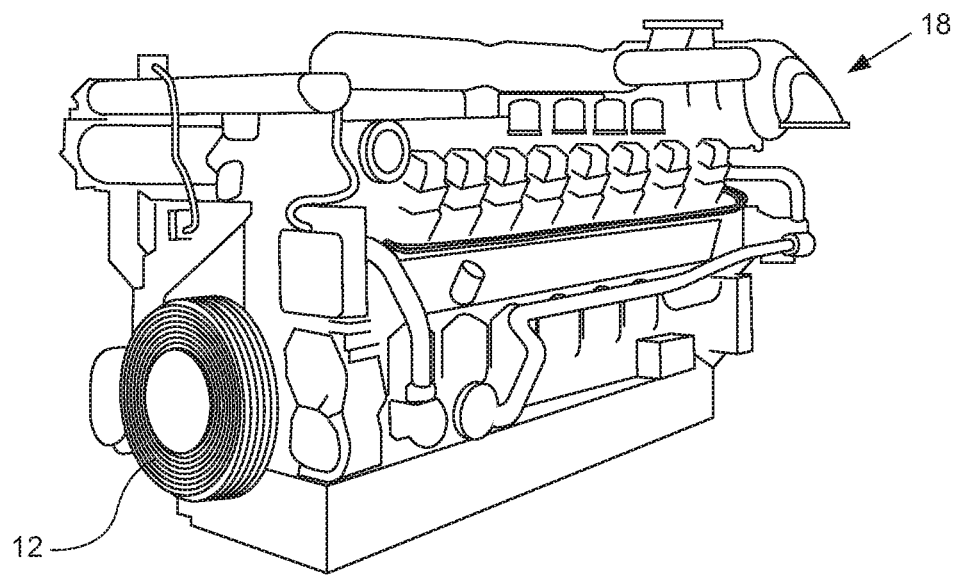
FIG. 1 is a schematic, perspective view of an engine.
Figure 2:
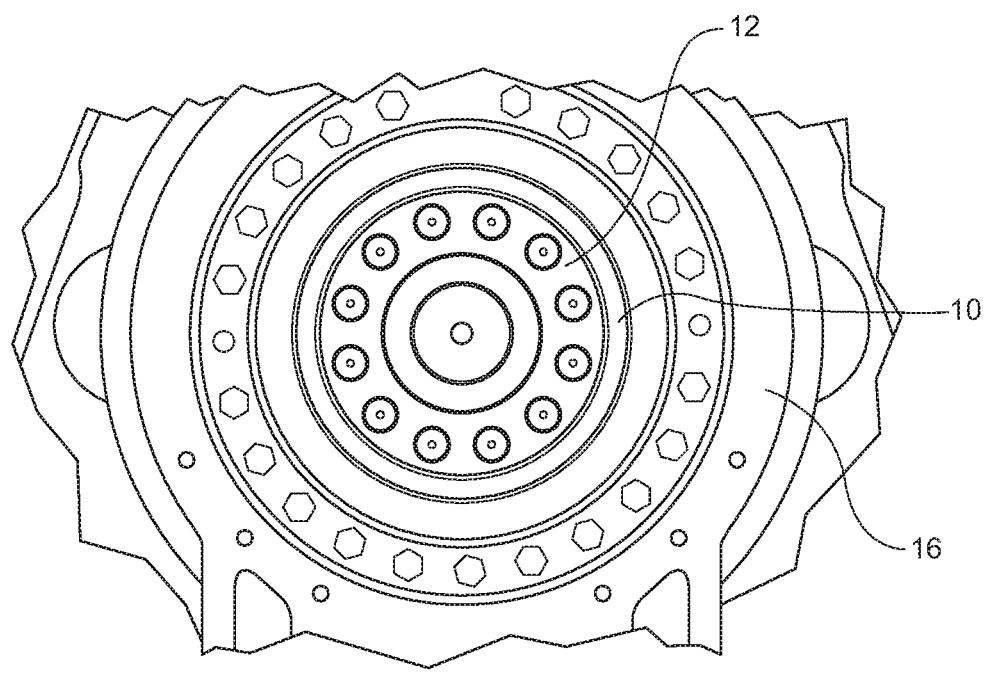
FIG. 2 is an enlarged, fragmentary end view of a housing and driveshaft of FIG. 1.

This disclosure relates to a shaft seal 10 for placement between a rotatably-mounted shaft 12 and a bore 14 of a housing 16 or the like. Turning to FIG. 1, a schematically illustrated engine 18 includes a housing 16 having a circular opening or bore 14 through which a rotatably-mounted crankshaft or shaft 12 extends. The interior 20 of the housing 16 may include oil or other lubricating fluid, while the exterior 22 of the housing 16 may be exposed to an external environment including air. In some applications, however, the housing may separate two fluids, for example, oil being disposed on one side of the housing and water being disposed along the other side of the housing.

In order to inhibit the passage of substances between the environments on either side of the housing 16, the shaft seal 10 is disposed along the interface between the housing 16 and the shaft 12. The shaft seal 10 presents a plurality of surfaces and seals disposed to inhibit the entry and eventual passage, for example, of oil from the interior 20 of the housing 16 to the exterior 22 of the housing 16, or dirt and debris from the exterior 22 of the housing 16 to the interior 20 of the housing 16. The shaft seal 10 is disposed along the circumference of the shaft 12, between the shaft 12 and a radially-disposed, axially-extending surface 24 of the bore 14 of the housing 16.

Figure 3:
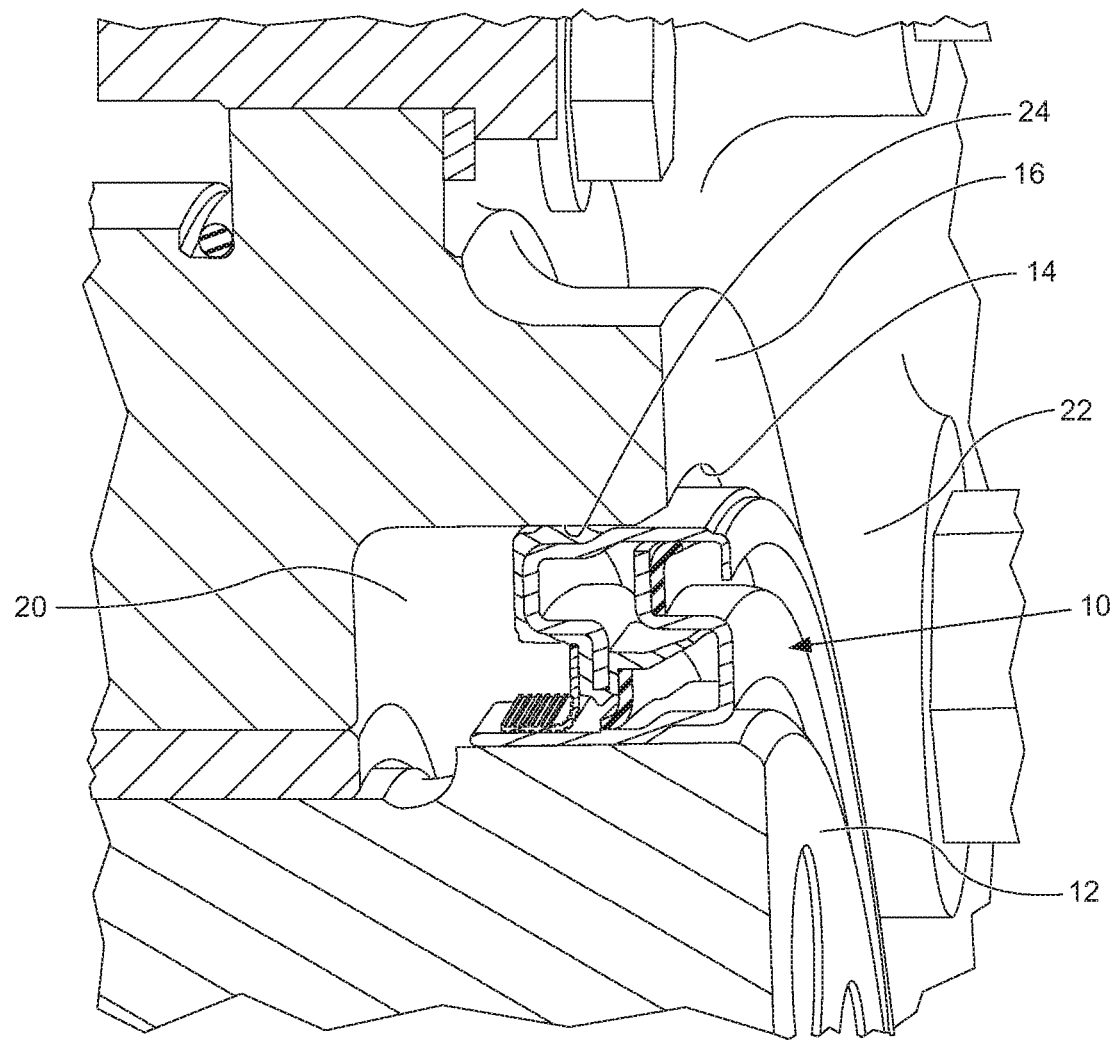
FIG. 3 is an enlarged fragmentary, cross-sectional, isometric view of a crankshaft, housing, and shaft seal according to the disclosed arrangement.
Figure 4:
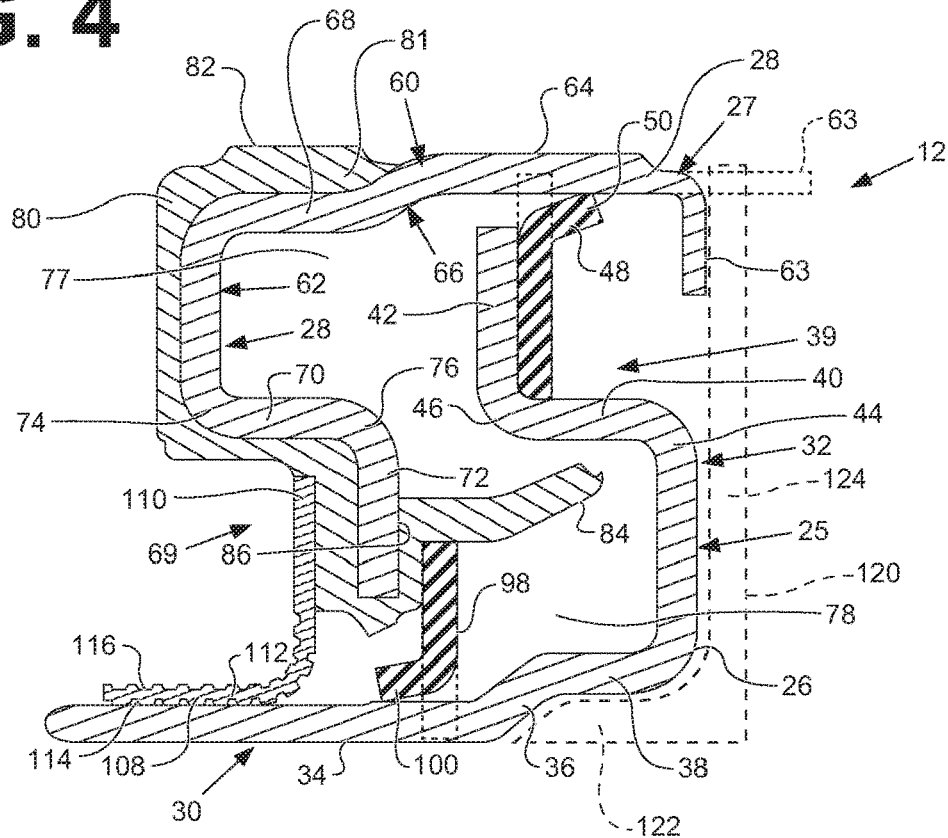
FIG. 4 is a cross-section of the shaft seal of FIG. 3.

Referring now to FIGS. 3 and 4, the shaft seal 10 is a ring-shaped structure and includes a radial shaft-sealing sleeve assembly 25 having a radial shaft-sealing sleeve 26 that circumferentially surrounds and typically rotates with the shaft 12 when installed on the shaft 12, and an outer carrier assembly 27 including an outer carrier 28 that seats against the radially-disposed, axially-extending surface 24 of the bore 14 of the housing 16. The radial shaft-sealing sleeve 26 and the outer carrier 28 are formed of a stamped metal, such as steel, and act as the framework to which other ring shaped sealing elements are coupled.

Turning first to the radial shaft-sealing sleeve assembly 25, the radial shaft-sealing sleeve 26 is ring shaped, and includes an axially-extending portion 30 and a radially-extending portion 32. The axially-extending portion 30 presents an inner radial surface 34 that contacts the shaft 12. In at least one embodiment, the inner radial surface 34 of the radial shaft-sealing sleeve 26 that contacts the shaft 12 may include a coating that enhances the sealing ability of the radial shaft-sealing sleeve 26 against the surface of the shaft 12. The coating may be any appropriate substance already known or not yet known in the art.

As illustrated in FIGS. 3 and 4, the axially-extending portion 30 of the radial shaft-sealing sleeve 26 may include a dogleg section 36 that positions an offset section 38 of the axially-extending portion 30 from the inner radial surface 34, the significance of which will be explained below. In the alternate embodiment illustrated in FIG. 5, the axially-extending portion 30 may present a continuous axially-extending portion 30 such that the inner radial surface 34 that may contact the shaft 12 along substantially the entire length of the axially-extending portion 30.

In order to facilitate sealing of the radial shaft-sealing sleeve 26 with the outer carrier 28, the radially-extending portion 32 of the radial shaft-sealing sleeve 26 further includes an internally offset section 39 that bends back toward the outer carrier 28. The internally offset section 39 includes a generally axially-extending section 40 and a generally radially-extending section 42. While illustrated as including right angle bends 44, 46, the bends 44, 46 may be greater or less than right angles.

Figure 5:
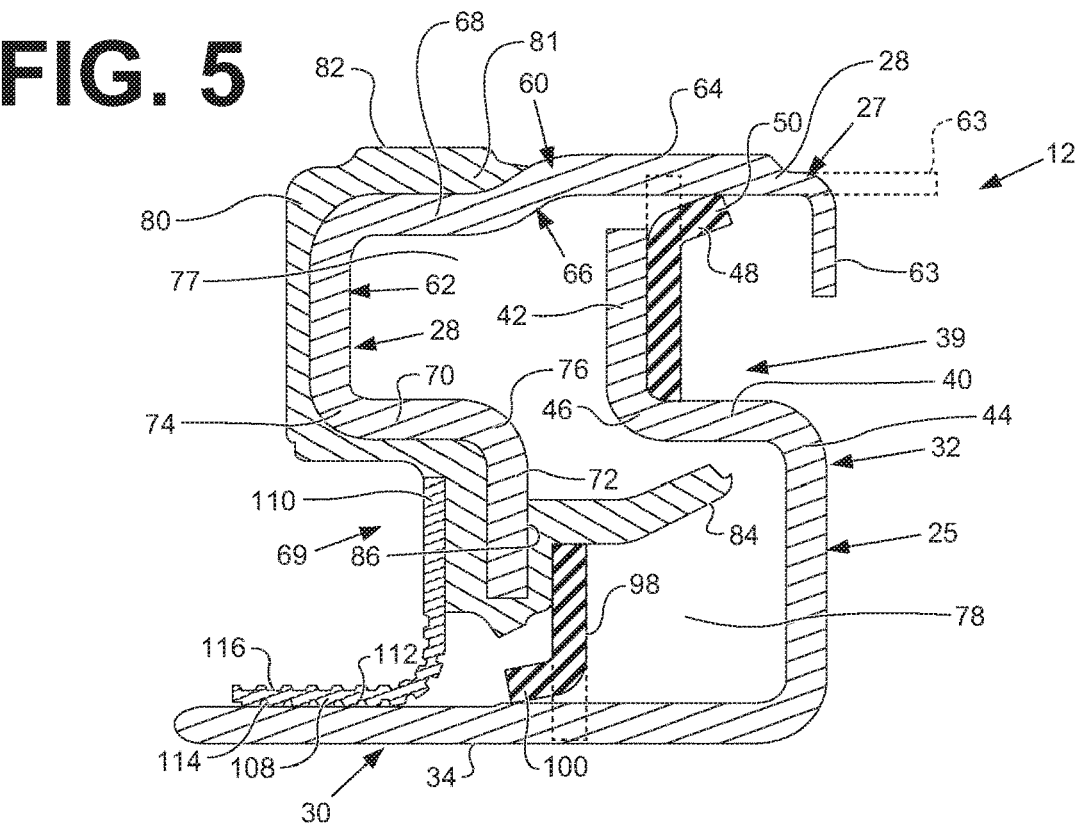
FIG. 5 is a cross-section of an alternate embodiment of a shaft seal.

A first contact exclusion lip 48 is secured to the generally radially-extending section 42 of the radially-extending portion 32. Referring to FIGS. 4 and 5, the first contact exclusion lip 48 is illustrated in dotted lines in the unassembled position, and in solid lines in the assembled position. As discussed further below, when the radial shaft-sealing sleeve 26 is assembled with the outer carrier 28, a distal end 50 of the first contact exclusion lip 48 is arched to the position illustrated in solid lines in FIGS. 4 and 5. In this way, the distal end 50 of the first contact exclusion lip 48 is biased into the outer carrier 28 to inhibit the passage of, for example, dirt and debris between the first contact exclusion lip 48 and the outer carrier 28.

The first contact exclusion lip 48 may be formed of any appropriate material and may be bonded to the generally radially-extending section 42 by any appropriate method, as will be known and understood by those of skill in the art, so long as the distal end 50 of the first contact exclusion lip 48 is biased outward into contact with the outer carrier 28 in the assembled position. In at least one embodiment, the first contact exclusion lip 48 is formed of a resilient, nonwoven, fibrous material. The first contact exclusion lip 48 may be fabricated by any appropriate method. For example, the first contact exclusion lip 48 may be die cut to the desired shape and size. While the illustrated first contact exclusion lip 48 is illustrated as a flat disk in its unassembled position, it may have an alternative unassembled profile, again, so long as the distal end 50 of the first contact exclusion lip 48 is biased into contact with the outer carrier 28 when the shaft seal 10 is assembled.

Turning now to the outer carrier assembly 27, as with the radial shaft-sealing sleeve 26 and the associated first contact exclusion lip 48 of the radial shaft-sealing sleeve assembly 25, the outer carrier 28 and the associated sealing components are ring shaped. The outer carrier 28 likewise includes an axially-extending portion 60 and a radially-extending portion 62.

The axially-extending portion 60 includes a distal end 63. The distal end 63 is illustrated in the pre-assembly position in dotted lines in FIGS. 4 and 5, and in the final assembly position in solid lines. As will be further explained with regard to the assembly of the shaft seal 10, when the ring-shaped radial shaft-sealing sleeve 26 and the outer carrier 28 are assembled together, the distal end 63 of the outer carrier 28 is disposed in the position shown in dotted lines in order to permit the passage of the generally radially-extending section 42 of the radially-extending portion 32 of the radial shaft-sealing sleeve 26. With the radial shaft-sealing sleeve 26 and the outer carrier 28 positioned relative to one another, the distal end 63 of the axially-extending portion 60 of the outer carrier 28 is bent to the position illustrated in solid lines. In this way, the generally radially-extending section 42 of the radially-extending portion 32 of the radial shaft-sealing sleeve 26 is held in a position between the distal end 63 of the axially-extending portion 60 and the radially-extending portion 62 of the outer carrier 28.

The axially-extending portion 60 further presents an outer radial surface 64 that contacts the radially-disposed, axially-extending surface 24 of the bore 14. As with the radial shaft-sealing sleeve 26, in at least one embodiment, the outer radial surface 64 of the outer carrier 28 that contacts the bore 14 may include a coating that enhances the sealing ability of the outer carrier 28 against the surface of the bore 14. The coating may be any appropriate substance already known or not yet known in the art. The axially-extending portion 60 of the outer carrier 28 includes a dogleg section 66 that positions an offset section 68 of the axially-extending portion 60, the offset section 68 being offset from the outer radial surface 64, the significance of which will be explained below.

The radially-extending portion 62 of the outer carrier 28 further includes an internally offset section 69 that bends back toward the radial shaft-sealing sleeve 26 in the assembled position. The offset section 69 includes a generally axially-extending section 70 and a generally radially-extending section 72. While illustrated as including right angle bends 74, 76, the bends 74, 76 may be somewhat greater or less than right angles illustrated, so long as the outer carrier 28 may be readily fabricated.

As may be seen in FIGS. 3-5, when the radial shaft-sealing sleeve 26 and the outer carrier 28 are assembled together, they form at least one internal chamber 79. In the illustrated embodiments, two connected chambers 77, 78 are formed. That is, they form a first chamber 77 generally between the generally radially-extending section 42 of the internally offset section 39 of the radially-extending portion 32 of the radial shaft-sealing sleeve 26, and the axially-extending portion 60, radially-extending portion 62, and generally axially-extending section of the offset section 69 of the radially-extending portion 62 of the outer carrier 28. They also form a second chamber 78 generally between the generally radially-extending section 72 of the offset section 69 of the radially-extending portion 62 of the outer carrier 28, and the axially-extending portion 30, radially-extending portion 32, and generally axially-extending section 40 of the internally offset section 39 of the radially-extending portion 32 of the radial shaft-sealing sleeve 26.

In order to enhance sealing of the outer carrier 28 with the bore 14, a molded seal 80 is provided along one or more portions of the surfaces of the outer carrier 28. More particularly, the molded seal 80 includes an outer radial section 81 that is disposed along the offset section 68 of the axially-extending portion 60. The outer radial section 81 of the molded seal 80 presents a seal outer radial surface 82 that may be disposed against the radially-disposed, axially-extending surface 24 of the bore 14 when assembled between the housing 16 and the shaft 12. In at least one embodiment, the seal outer radial surface 82 of the outer radial section 81 of the molded seal 80 presents a radius that is greater than a radius of the outer radial surface 64 of the outer carrier 28 in the free state, as illustrated, for example, in FIGS. 4 and 5. Accordingly, when the shaft seal 10 is assembled into a bore 14, as illustrated in FIG. 3, the outer radial section 81 of the molded seal 80 is compressed between the bore 14 and the offset section 68. In this way, the compressed molded seal 80 may further minimize the opportunity for migration of substances within the housing 16, such as oil or other fluid, for example, between the shaft seal 10 and the bore 14.

To further inhibit the passage of substances between the interior 20 and exterior 22 of the housing 16, the molded seal 80 may include a molded seal lip 84 that extends into the at least one internal chamber 79, in the illustrated embodiments providing a partial separation of the first and second chambers 77, 78. As seen most clearly in FIGS. 4 and 5, the molded seal lip 84 may extend into the second chamber 78 from an inside surface 86 of the generally radially-extending section 72 of the internally offset section 69 of the radially-extending portion 62 of the outer carrier 28. That is, the molded seal lip 84 may be elongated and extend in a generally axially-extending direction from the generally radially-extending section 72 of the internally offset section 69 of the radially-extending portion 62 of the outer carrier 28. In at least one embodiment, the molded seal lip 84 is elongated and extends generally toward the generally axially-extending section 40 of the internally offset section 39 of the radially-extending portion 32 of the radial shaft-sealing sleeve 26. As the radial shaft-sealing sleeve 26 rotates with the shaft 12, such dirt or debris would be thrown back out toward the first chamber 77 as a result of centrifugal force.

In this way, the molded seal 80 is a static seal that creases a labyrinth exclusion system for preventing the passage of substances between the interior 20 and exterior 22 of the housing 16. Should any substance from the exterior 22 of the housing 16, such as dirt or debris, for example, pass through the interface between the first contact exclusion lip 48 and the axially-extending portion 60 of the outer carrier 28 to enter the first chamber 77, the substance will be inhibited from further passing to the second chamber 78.

The molded seal 80 may be fabricated from any appropriate material by any appropriate method. For example, the molded seal 80 may be formed of a material such as a molded rubber or polytetrafluoroethylene (PTFE), and may be molded onto the outer carrier 28 or separately formed and then secured to the outer carrier 28. Further, any appropriate bonding agent may be provided, for example, along surfaces of the outer carrier 28 in order to enhance bonding of the molded seal 80 to the outer carrier 28. It will be appreciated that the outer radial section 81 and molded seal lip 84 of the molded seal 80 may be formed as a single unit, as illustrated, or as two or more separate portions of the molded seal 80. In the illustrated embodiments, the molded seal 80 is disposed along not only the offset section 68 of the axially-extending portion 60 of the outer carrier 28 and an inward facing surface of the generally radially-extending section 72 of the internally offset section 69, but also along outward facing surfaces of the section 61 of the radially-extending portion of the outer carrier 28, the generally axially-extending section 70 of the internally offset section 69, and the generally radially-extending section 72 of the internally offset section 69.

A second contact exclusion lip 98 is secured to the generally radially-extending section 72 of the radially-extending portion 62. Referring to FIGS. 4 and 5, the second contact exclusion lip 98 is illustrated in dotted lines in the unassembled position, and in solid lines in the assembled position. When the radial shaft-sealing sleeve 26 is assembled with the outer carrier 28, a distal end 100 of the second contact exclusion lip contacts the radial shaft-sealing sleeve 26 to arch the second contact exclusion lip 98 to the position illustrated in solid lines in FIGS. 4 and 5. In this way, the second contact exclusion lip 98 is biased into the radial shaft-sealing sleeve 26 to inhibit the passage of, for example, dirt and debris, oil, or other fluid or substance between the second contact exclusion lip 98 and the radial shaft-sealing sleeve 26.

As with the first contact exclusion lip 48, the second contact exclusion lip 98 may be formed of any appropriate material. In at least one embodiment, the second contact exclusion lip 98 is formed of a resilient, nonwoven, fibrous material. The second contact exclusion lip 98 may be fabricated by any appropriate method. For example, the second contact exclusion lip 98 may be die cut to the desired shape and size. While the illustrated second contact exclusion lip 98 is illustrated as a flat disk in its unassembled position, it may have an alternative unassembled profile, so long as the second contact exclusion lip 98 is biased into contact with the radial shaft-sealing sleeve 26 when assembled.

In the illustrated embodiments, the second contact exclusion lip 98 is secured to a surface of the molded seal 80, which is secured to the generally radially-extending section 72 of the internally offset section 69 of the radially-extending portion 62 of the outer carrier 28. It will be appreciated, however, that the second contact exclusion lip 98 may be secured directly to the outer carrier 28 in an embodiment wherein the molded seal 80 does not extend along the generally radially-extending section 72 of the internally offset section 69 of the radially-extending portion 62 of the outer carrier 28. The second contact exclusion lip 98 may be secured to the molded seal 80 or directly to the outer carrier 28 by any appropriate method, as will be understood by those of skill in the art, so long as the second contact exclusion lip 98 is biased outward into contact with the radial shaft-sealing sleeve 26 in the assembled position.

In order to further inhibit the passage of substances, such as oil or another fluid, from the interior 20 of the housing 16 to the exterior 22 of the housing 16, a main pumping lip 108 may be provided. The main pumping lip 108 includes a coupling portion 110, and a dynamic seal portion 112. The coupling portion 110 is secured to the generally radially-extending section 72 of the internally offset section 69 of the radially-extending portion 62 of the outer carrier 28. In the illustrated embodiments, the coupling portion 110 of the main pumping lip 108 is secured to a surface of the molded seal 80, which molded to the generally radially-extending section 72. It will be appreciated, however, that the main pumping lip 108 may be secured directly to the outer carrier 28 in an embodiment wherein the molded seal 80 does not extend along the generally radially-extending section 72 of the internally offset section 69 of the radially-extending portion 62 of the outer carrier 28. The main pumping lip 108 may be secured to the molded seal 80 or directly to the outer carrier 28 by any appropriate method, as will be understood by those of skill in the art, so long as the main pumping lip 108 is biased outward into contact with the radial shaft-sealing sleeve 26 in the assembled position.

The dynamic seal portion 112 of the main pumping lip 108 includes at least one molded contact groove 114, here, a plurality of molded contact grooves 114 along the side of the main pumping lip 108 that rides against the radial shaft-sealing sleeve 26. In one or more embodiments, the molded contact grooves 114 have a helical configuration and are configured to channel fluids back toward the interior 20 of the housing 16 as the shaft 12 rotates relative to the housing 16. Further, in one or more embodiments, the main pumping lip 108 likewise includes at least one molded backside groove 116, here, a plurality of molded backside grooves 116 along the side of the main pumping lip 108 opposite to the radial shaft-sealing sleeve 26 in the assembled configuration. It will be appreciated that the backside grooves 116 may provide additional flexibility to the main pumping lip 108 and may assist in allowing the main pumping lip 108 to conform to the surface of the radial shaft-sealing sleeve 26. As illustrated in FIGS. 4 and 5, the molded contact grooves 114 and the molded backside grooves 116 may be staggered in order to provide maximum flexibility for the dynamic seal portion 112 of the main pumping lip 108 to conform to the surface of the radial shaft-sealing sleeve 26 to inhibit the passage of, for example, oil or other fluid or substance between the main pumping lip 108 and the radial shaft-sealing sleeve 26.

The main pumping lip 108 may be formed of any appropriate material. In at least one embodiment, the main pumping lip 108 is formed of a polytetrafluoroethylene (PTFE) material. The main pumping lip 108 may be fabricated by any appropriate method. For example, the main pumping lip 108 may be coined to the desired shape and size with molded grooves 114, 116.

In assembly, the radial shaft-sealing assembly 25, including the radial shaft-sealing sleeve 26 and the first contact exclusion lip 48, and the outer carrier assembly 27, including the outer carrier 28 with the molded seal 80, second contact exclusion lip 98 and the main pumping lip 108, are assembled together by axially sliding the radial shaft-sealing assembly 25 and the outer carrier assembly 27 together. As the radial shaft-sealing assembly 25 and the outer carrier assembly 27 are slid together, the first contact exclusion lip 48 slides along the axially-extending portion 30 of the radial shaft-sealing sleeve 26, while the second contact exclusion lip 98 and the main pumping lip 108 slide along the axially-extending portion 60 of the outer carrier 28. Once assembled, the distal end 63 of the axially-extending portion 60 of the outer carrier 28 is bent down into the position illustrated in solid likes in FIGS. 4 and 5 to secure the assemblies 25, 27 together.

The shaft seal 10 may be pressed into the position illustrated in FIG. 3 in final assembly with a shaft 12 and housing 16. In a further embodiment, the shaft seal 10 illustrated in FIGS. 3 and 4 may include an add-on exclusion ring 120, illustrated in dotted lines in FIG. 4. The add-on exclusion ring 120 may have an L-shaped cross-section with an axially-extending leg 122 and a radially-extending leg 124. In assembly, the axially-extending leg 122 may be pressed into the offset section 38 of the inner radial surface 34 of the axially-extending portion 30 of the radial shaft-sealing sleeve 26. The radially-extending leg 124 is then disposed against the surfaces of the radially-extending portion 32 of the radial shaft-sealing sleeve 26 and the outside, radial surface of the distal end 63 of the axially-extending portion 60 of the outer carrier 28. The add-on exclusion ring 120 may be assembled to the shaft seal 10 either prior to or after assembly with the shaft 12 and the housing 16.

INDUSTRIAL APPLICABILITY

The present disclosure is applicable to sealing arrangements between a rotating shaft 12 and housing 16. While the arrangement is illustrated in connection with a crankshaft, the arrangement disclosed herein has universal applicability in various other types of rotating shafts and housings.

The shaft seal 10 including first and second exclusion lips 48, 98 may provide desirable early hour debris exclusion. The labyrinth created by the radial shaft-sealing sleeve assembly 25 and the outer carrier assembly 27, including the molded seal lip 84 of the molded seal 80, may provide desirable long hour debris resistance. In at least one embodiment, an add-on exclusion ring may provide enhanced resistance to debris by lengthening the labyrinth. The static joints created by the molded seal 80 may reduce leak paths within the seal assembly 10. The first and second exclusion lips 48, 98 map provide desirable wear resistance. A molded main pumping lip 108 may reduce manufacturability variability over prior designs.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A shaft seal for disposition between a shaft mounted for rotation and a bore, the shaft seal comprising:
   a radial shaft-sealing sleeve assembly including
      a radial shaft-sealing sleeve having
         an axially-extending portion, at least a portion of which is configured for placement adjacent the shaft, and
         a radially-extending portion including an internally offset section having a generally axially-extending section and a generally radially-extending section,
      a first contact exclusion lip coupled to the generally radially-extending section of the radially-extending portion of the radial shaft-sealing sleeve, the first contact exclusion lip having a distal end, and
   an outer carrier assembly including
      an outer carrier having
         an axially-extending portion, at least a portion of which is configured for placement adjacent the bore, and an offset section, and
         a radially-extending portion including an internally offset section having a generally axially-extending section and a generally radially-extending section, the generally radially-extending section of the internally offset section of the radially-extending portion of the outer carrier including an inside surface,
      a molded seal having
         an outer radial section extending along the offset section of the axially-extending portion of the outer carrier, the outer radial section of the molded seal including a seal outer radial surface configured for placement against the bore, and
         a molded seal lip extending from the inside surface of the generally radially-extending section of the internally offset section of the radially-extending portion of the outer carrier, the molded seal lip being elongated,
      a second contact exclusion lip coupled to the generally radially-extending section of the internally offset section of the radially-extending portion of the outer carrier, the second contact exclusion lip having a distal end, and
      a main pumping lip including a dynamic seal portion and a coupling portion coupled to the generally radially-extending section of the internally offset section of the radially-extending portion of the outer carrier,
   the radial shaft-sealing sleeve assembly and the outer carrier assembly being rotatable relative to one another, the distal end of the first contact exclusion lip being dynamically disposed against and biased toward the axially-extending portion of the outer carrier, the distal end of the second contact exclusion lip being dynamically disposed against and biased toward the axially-extending portion of the radial shaft-sealing sleeve, and the dynamic seal portion of the main pumping lip being dynamically disposed against and biased toward the axially-extending portion of the radial shaft-sealing sleeve,
   the radial shaft-sealing sleeve assembly and the outer carrier assembly being disposed to form at least one internal chamber, the elongated molded seal lip extending into the at least one internal chamber.

2. The shaft seal of claim 1 wherein the at least one internal chamber includes a first chamber and a second chamber,
   the first chamber being formed between the generally radially-extending section of the internally offset section of the radially-extending portion of the radial shaft-sealing sleeve, and the axially-extending portion, the radially-extending portion, and the generally axially-extending section of the internally offset section of the radially-extending portion of the outer carrier, and
   the second chamber being formed between the generally radially-extending section of the internally offset section of the radially-extending portion of the outer carrier, and the axially-extending portion, the radially-extending portion, and the generally axially-extending section of the internally offset section of the radially-extending portion of the radial shaft-sealing sleeve,
   the elongated molded seal lip extending into the second chamber.

3. The shaft seal of claim 1 wherein the molded seal is a unitary structure, the molded seal further extending along the generally axially-extending section and the generally radially-extending section of the internally offset section of the radially-extending portion of the outer carrier.

4. The shaft seal of claim 3 wherein the second contact exclusion lip is secured to the molded seal, which is secured to the generally radially-extending section of the internally offset section of the radially-extending portion of the outer carrier.

5. The shaft seal of claim 3 wherein the coupling portion of the main pumping lip is secured to the molded seal, which is secured to the generally radially-extending section of the internally offset section of the radially-extending portion of the outer carrier.

6. The shaft seal of claim 1 wherein at least one of the first contact exclusion lip and the second contact exclusion lip is formed of a non-woven, fibrous material.

7. The shaft seal of claim 1 wherein the first contact exclusion lip and the second contact exclusion lip are formed of a non-woven, fibrous material.

8. The shaft seal of claim 1 wherein the main pumping lip is formed of polytetrafluoroethylene.

9. The shaft seal of claim 1 wherein the dynamic seal portion of the main pumping lip includes at least one molded contact groove, the at least one molded contact groove being disposed against the radial shaft-sealing sleeve.

10. The shaft seal of claim 9 wherein the at least one molded contact groove includes a helical groove.

11. The shaft seal of claim 9 wherein the dynamic seal portion of the main pumping lip further includes at least one molded backside groove disposed along a surface of the main pumping lip opposite the at least one molded contact groove.

12. The shaft seal of claim 1 wherein the molded seal lip is elongated in a generally axially-extending direction.

13. The shaft seal of claim 1 wherein the radial shaft-sealing sleeve and the outer carrier are formed of a stamped metal.

14. The shaft seal of claim 1 wherein the molded seal comprises rubber molded to the outer carrier.

15. An engine comprising:
a housing including a bore, the housing defining an interior and an exterior;
a crank shaft rotatably mounted through the bore; and
a shaft seal disposed between the shaft and the bore, the shaft seal including:
a radial shaft-sealing sleeve assembly disposed for rotation with the crank shaft, the radial shaft-sealing sleeve assembly including
a radial shaft-sealing sleeve having
an axially-extending portion, at least a portion of which is configured for placement adjacent the shaft, and
a radially-extending portion including an internally offset section having a generally axially-extending section and a generally radially-extending section;
a first contact exclusion lip coupled to the generally radially-extending section of the radially-extending portion of the radial shaft-sealing sleeve, the first contact exclusion lip having a distal end; and
an outer carrier assembly disposed within the bore, the outer carrier assembly including
an outer carrier having
an axially-extending portion, at least a portion of which is configured for placement adjacent the bore, and an offset section, and
a radially-extending portion including an internally offset section having a generally axially-extending section and a generally radially-extending section, the generally radially-extending section of the internally offset section of the radially-extending portion of the outer carrier including an inside surface;
a molded seal having
an outer radial section extending along the offset section of the axially-extending portion of the outer carrier, the outer radial section of the molded seal including a seal outer radial surface configured for placement against the bore, and
a molded seal lip extending from the inside surface of the generally radially-extending section of the internally offset section of the radially-extending portion of the outer carrier, the molded seal lip being elongated;
a second contact exclusion lip coupled to the generally radially-extending section of the internally offset section of the radially-extending portion of the outer carrier, the second contact exclusion lip having a distal end; and
a main pumping lip including a dynamic seal portion and a coupling portion coupled to the generally radially-extending section of the internally offset section of the radially-extending portion of the outer carrier;
the radial shaft-sealing sleeve assembly being rotatable relative to the outer carrier assembly, the distal end of the first contact exclusion lip being dynamically disposed against and biased toward the axially-extending portion of the outer carrier, the distal end of the second contact exclusion lip being dynamically disposed against and biased toward the axially-extending portion of the radial shaft-sealing sleeve, and the dynamic seal portion of the main pumping lip being dynamically disposed against and biased toward the axially-extending portion of the radial shaft-sealing sleeve.

16. The engine of claim 15 wherein the radial shaft-sealing sleeve assembly and the outer carrier assembly are disposed to form a first chamber and a second chamber, wherein
the first chamber being formed between the generally radially-extending section of the internally offset section of the radially-extending portion of the radial shaft-sealing sleeve, and the axially-extending portion, the radially-extending portion, and the generally axially-extending section of the internally offset section of the radially-extending portion of the outer carrier, and
the second chamber being formed between the generally radially-extending section of the internally offset section of the radially-extending portion of the outer carrier, and the axially-extending portion, the radially-extending portion, and the generally axially-extending section of the internally offset section of the radially-extending portion of the radial shaft-sealing sleeve, the elongated molded seal lip extending into the second chamber.

17. A method of fabricating a shaft seal for disposition between a shaft mounted for rotation and a bore, the method comprising the steps of:
forming a radial shaft-sealing sleeve assembly by:
forming a radial shaft-sealing sleeve having
an axially-extending portion, at least a portion of which is configured for placement adjacent the shaft, and
a radially-extending portion including an internally offset section having a generally axially-extending section and a generally radially-extending section,
forming a first contact exclusion lip,
securing the first contact exclusion lip to the generally radially-extending section of the radially-extending portion of the radial shaft-sealing sleeve, the first contact exclusion lip having a distal end;
forming an outer carrier assembly by:
forming an outer carrier having
an axially-extending portion, at least a portion of which is configured for placement adjacent the bore, and an offset section, and
a radially-extending portion including an internally offset section having a generally axially-extending section and a generally radially-extending section, the generally radially-extending section of the internally offset section of the radially-extending portion of the outer carrier including an inside surface, molding to the outer carrier a molded seal having
an outer radial section extending along the offset section of the axially-extending portion of the outer carrier, the outer radial section of the molded seal including a seal outer radial surface configured for placement against the bore, and
a molded seal lip extending from the inside surface of the generally radially-extending section of the internally offset section of the radially-extending portion of the outer carrier, the molded seal lip being elongated, forming a second contact exclusion lip, securing the second contact exclusion lip to the generally radially-extending section of the internally offset section of the radially-extending portion of the outer carrier, the second contact exclusion lip having a distal end, and forming a main pumping lip including a dynamic seal portion and a coupling portion, coupling the coupling portion of the main pumping lip to the generally radially-extending section of the internally offset section of the radially-extending portion of the outer carrier; and axially sliding the radial shaft-sealing sleeve assembly into relatively rotatable position within the outer carrier assembly with the distal end of the first contact exclusion lip being dynamically disposed against and biased toward the axially-extending portion of the outer carrier, the distal end of the second contact exclusion lip being dynamically disposed against and biased toward the axially-extending portion of the radial shaft-sealing sleeve, and the dynamic seal portion of the main pumping lip being dynamically disposed against and biased toward the axially-extending portion of the radial shaft-sealing sleeve.

18. The method of claim 17 wherein the step of axially sliding the radial shaft-sealing sleeve assembly and the outer carrier assembly includes disposing the radial shaft-sealing sleeve assembly within the outer carrier assembly to form a first chamber and a second chamber, the first chamber being formed between the generally radially-extending section of the internally offset section of the radially-extending portion of the radial shaft-sealing sleeve, and the axially-extending portion, the radially-extending portion, and the generally axially-extending section of the internally offset section of the radially-extending portion of the outer carrier, and the second chamber being formed between the generally radially-extending section of the internally offset section of the radially-extending portion of the outer carrier, and the axially-extending portion, the radially-extending portion, and the generally axially-extending section of the internally offset section of the radially-extending portion of the radial shaft-sealing sleeve, the elongated molded seal lip extending into the second chamber.

19. The method of claim 17 wherein forming the shaft-sealing sleeve includes stamping the shaft-sealing sleeve from a metal material, and forming the outer carrier includes stamping the shaft-sealing sleeve from a metal material.

20. The method of claim 17 further including at least one of
bending a distal end of the axially-extending portion of the outer carrier radially inward following the step of axially sliding the radial shaft-sealing assembly into the outer carrier assembly, and
sliding an L-shaped add-on exclusion ring into engagement with an offset section of an inner radial surface of the axially-extending portion of the radial shaft-sealing sleeve.

* * * * *